Patented June 13, 1933                                                    1,913,748

UNITED STATES PATENT OFFICE

WILLIAM J. COTTON, OF BUFFALO, NEW YORK, ASSIGNOR TO NATIONAL ANILINE & CHEMICAL COMPANY, INC., OF NEW YORK, N. Y., A CORPORATION OF NEW YORK

PROCESS OF PREPARING STEBBINS ACID

No Drawing.        Application filed November 15, 1929.   Serial No. 407,578.

This invention relates to the preparation of Stebbins acid (2.1-naphtholsulfonic acid), and it relates particularly to improvements in the process of preparing Stebbins acid by the sulfonation of beta-naphthol (2-naphthol).

The principal object of the invention is to increase the yield of Stebbins acid obtained in the sulfonation of beta-naphthol with concentrated sulfuric acid.

Another object of the invention is to increase the purity of the Stebbins acid obtained in the sulfonation of beta-naphthol with sulfuric acid.

Other objects of the invention will in part be obvious and will in part appear hereinafter.

When beta-naphthol is sulfonated with sulfuric acid according to known processes for the production of Stebbins acid, there is produced a mixture comprising Stebbins acid (2.1-naphthol-sulfonic acid) and Bayer's acid (2.8-naphtholsulfonic acid) together with some Schaeffer's acid (2.6-naphtholsulfonic acid) in varying proportions. I have found in the sulfonation of beta-naphthol with sulfuric acid for the production of Stebbins acid, that if the Stebbins acid produced is removed from the sphere of the reaction practically as soon as possible, the yield of Stebbins acid is increased while the amount of Bayer's acid produced is correspondingly decreased.

The present invention accordingly comprises the application of the above discovery to the preparation of Stebbins acid by the sulfonation of beta-naphthol. The invention will be exemplified in the process hereinafter disclosed, and its scope will be indicated in the claims.

In the practice of the present invention the objects thereof are accomplished by reacting beta-naphthol with concentrated sulfuric acid under such conditions that the Stebbins acid as formed is caused to separate from the solution substantially as soon as the reaction mixture becomes supersaturated therewith, or as soon thereafter as is possible, and the sulfonation is continued until it is complete. The Stebbins acid may be then separated from the reaction mixture.

In carrying out the process of the invention in accordance with a preferred method of procedure, beta-naphthol is added, preferably in a minimum amount of time, to concentrated sulfuric acid at a temperature not exceeding about 25° C. When the reaction mixture becomes supersaturated with respect to Stebbins acid, the Stebbins acid is caused to crystallize out of solution, thereby removing it from the sphere of the reaction, and the sulfonation is allowed to continue until substantially all of the beta-naphthol has been sulfonated, the Stebbins acid continuing to crystallize out as it is formed. The Stebbins acid may then be separated from the sulfonation mixture; as for example, by drowning in water while preventing the temperature from rising above the point where undesired hydrolysis of Stebbins acid occurs, filtering to remove traces of insolubles present, salting out the Stebbins acid with a suitable alkali-metal salt, and filtering off the alkali-metal salt of Stebbins acid thereby produced.

The beta-naphthol employed is preferably of a high grade of purity and in a finely divided form. For ease of operation it is added with agitation to a batch of sulfuric acid precooled to a temperature not exceeding about 15° C., preferably not exceeding about 5° C. The sulfuric acid may vary in concentration from about 93 per cent. to 100 per cent. $H_2SO_4$, acid of 98 per cent. to 100 per cent. concentration being preferred. The beta-naphthol is added as rapidly as possible, a maximum period of time for the addition being about 5 to 10 minutes depending upon the strength of acid and temperature control, and a period of time not exceeding 3 minutes being preferred. In order to prevent, as far as is possible, the formation of Bayer's acid (2.8-naphtholsulfonic acid) the Stebbins acid formed is removed from the sphere of the reaction as soon as possible. This may be brought about by causing the Stebbins acid to crystallize out of the reaction mixture as soon as the reaction mixture becomes supersaturated therewith. It sometimes happens that the Stebbins acid will spontaneously crystallize from the reaction mixture; but, unless the crystallization is caused to take place within a minimum period of time after the reaction mixture has become saturated therewith, the yield of Stebbins acid will be decreased and the production of Bayer's acid will be increased. If crystalization of the Stebbins acid fails to occur when the reaction mixture becomes saturated or supersaturated with respect to Stebbins acid, crystallization is induced by seeding the reaction mixture with a small portion of crystals of Stebbins acid. For convenience, the seed is preferably a portion of a previous sulfonation mixture saved for the purpose. When operating with 98 per cent. to 100 per cent. sulfuric acid, the sulfonation mixture is preferably seeded within about 8 to about 13 minutes after all of the beta-naphthol has been added; with weaker acid, which requires a longer time for the sulfonation, seeding is not effective to produce crystallization until a somewhat later time. The sulfonation is preferably allowed to continue until a maximum amount of Stebbins acid is obtained, the Stebbins acid continuing to crystallize out as it is produced. The reaction may then be interrupted, in order to prevent loss of the Stebbins acid produced, by diluting the reaction mixture, while preventing the temperature of the dilution mass from rising excessively. This may be brought about by adding the sulfonation mixture with agitation, at the completion of the sulfonation, to ice or to suitably cooled water. The Stebbins acid, which goes into solution in the dilution liquid, may then be separated from the solution, preferably following a filtration of the dilution liquid to remove any unsulfonated beta-naphthol or other insoluble material present. This may be effected in a number of ways; e. g., by neutralizing the solution with lime, limestone, calcium sulfite, etc., filtering off the calcium sulfate formed, converting the calcium salts to sodium or potassium salts with sodium or potassium carbonate, sulfite, etc., filtering off the calcium carbonate, or other insoluble calcium salt, and salting out the sodium or potassium salt of Stebbins acid; by extracting the Stebbins acid with a suitable solvent; by neutralizing the solution with caustic alkali, and salting out the alkali-metal salt thus produced in solution; by directly salting out the Stebbins acid from the solution by the addition of an alkali-metal salt; etc.

The following example illustrates one method of practicing the invention. The parts are by weight.

*Example.*—220 parts of 100 per cent. sulfuric acid are cooled to a temperature of about 5° C., and 100 parts of beta-naphthol in finely divided condition (10 mesh or smaller) is added with agitation, not more than about 3 minutes being required for the addition. The temperature spontaneously rises to about 20° to 25° C. If after about 8 to 13 minutes from the completion of the addition of the beta naphthol the batch has not begun spontaneously to crystallize, a small portion of crystals of Stebbins acid is added to the reaction mixture. If this should fail to produce crystallization, additional portions are added at short intervals until crystallization of the Stebbins acid has been induced. Sulfonation is allowed to continue for about 30 minutes after the beta-naphthol has all been added, the temperature being maintained at a point not exceeding 30° C., and the mass is then mixed without delay with about 200 parts of ice while agitating. After substantially the whole sulfonation mixture has gone into solution, a small amount of diatomaceous earth, such as Filter Cel is added, and the mass is filtered with suction to remove any insoluble material present. Common salt (NaCl) is then added to the filtrate to salt out the Stebbins acid, about 150 parts thereof being required. The mixture is agitated for several hours to complete the salting out, is filtered on a suction filter at a temperature of about 25° C., and is sucked dry. Stebbins acid of a superior quality is thus obtained in a yield of approximately 95 per cent. of the theoretical, based upon the beta-naphthol employed.

It will be realized that the invention is not limited to the process and the details thereof which are set forth in this foregoing specific example. Thus, beta-naphthol of varying grades of purity may be employed, but it becomes increasingly difficult with a decrease in the purity of the beta-naphthol to induce crystallization of the Stebbins acid produced; and inasmuch as the yield of Stebbins acid is greater the sooner crystallization occurs, the yield of Stebbins acid is decreased. The strength of sulfuric acid may vary as above pointed out, crystallization, however, also being more difficult when the weaker acid is used. The amount of acid employed may vary from about 200 to 230 parts, preferably 215 to 220 parts of 98 per cent. to 100 per cent. sulfuric acid per 100 parts of beta-naphthol. With weaker sulfuric acid than about 98 per cent., the amount of acid employed is decreased in order to decrease the difficulty in producing crystallization of the Stebbins acid, but this also decreases the speed of the reaction, leading to delayed crystallization and a lowered yield of Stebbins acid, and requiring a longer time for the completion of the reaction. In seeding the reaction mixture, a crystal or crystals of the free Stebbins acid or of a soluble salt of Stebbins acid may be used, e. g., the sodium salt of Stebbins acid. The sulfonation mixture is preferably prevented from exceeding a temperature of about 30° C., as otherwise some of the crystallized Stebbins acid may go back into solution and isomerize, thereby decreasing the yield. In diluting the sulfonation mixture at the completion of the sulfonation, the sulfonation mixture may also be added to water efficiently cooled and agitated so that the temperature of the diluted mass does not exceed about 25° C. Instead of Filter Cel other equivalent filter aids may be employed to assist in the removal by filtration of the small amount of finely divided material present in suspension in the dilution mixture. The Stebbins acid may be salted out of the dilution mixture by other suitable alkali-metal salts, e. g., potassium chloride, etc., and the Stebbins acid alkali-metal salt may be filtered at other temperatures. A filtration temperature not exceeding about 25° C. is preferred, however, in order to prevent undue loss of product by solution in the mother liquors.

The invention thus affords a means of securing an increase in the yield and in the purity of Stebbins acid produced from beta-naphthol by sulfonation with sulfuric acid.

Since certain changes may be made in the process above described without departing from the scope of the invention, it is intended that all matter contained in the above description shall be interpreted as illustrative and not in a limiting sense.

It is also to be understood that the following claims are intended to cover all of the generic and specific features of the invention herein described.

I claim:

1. In the process of preparing Stebbins acid by the sulfonation of beta-naphthol with concentrated sulfuric acid, the improvement which comprises removing from the sphere of the reaction, as soon as possible, the Stebbins acid formed.

2. In the process of preparing Stebbins acid by the sulfonation of beta-naphthol with concentrated sulfuric acid, the improvement which comprises inducing crystallization of Stebbins acid from the reaction mixture substantially as soon as the reaction mixture becomes supersaturated therewith.

3. In the process of preparing Stebbins acid by the sulfonation of beta-naphthol with concentrated sulfuric acid, the improvement which comprises seeding the reaction mixture substantially as soon as it becomes saturated with Stebbins acid to cause the Stebbins acid formed to crystallize.

4. In the process of preparing Stebbins acid by the sulfonation of beta-naphthol with concentrated sulfuric acid, the improvement which comprises adding a crystal of Stebbins acid to the reaction mixture as a seed substantially as soon as the reaction mixture becomes saturated with Stebbins acid, whereby the Stebbins acid formed is caused to crystallize.

5. In the process of preparing Stebbins acid by the sulfonation of beta-naphthol with concentrated sulfuric acid, the improvement which comprises adding a crystal of an alkali-metal salt of Stebbins acid to the reaction mixture as a seed substantially as soon as the reaction mixture becomes saturated with Stebbins acid, whereby the Stebbins acid formed is caused to crystallize.

6. In the process of preparing Stebbins acid by the sulfonation of beta-naphthol with concentrated sulfuric acid, the improvement which comprises adding the beta-naphthol to the sulfuric acid within a period not exceeding 5 minutes, and causing the Stebbins acid to crystallize from the reaction mixture substantially as soon as the reaction mixture becomes supersaturated therewith.

7. In the process of preparing Stebbins acid by the sulfonation of beta-naphthol with concentrated sulfuric acid, the improvement which comprises rapidly adding the beta-naphthol to the sulfuric acid pre-cooled to a temperature not exceeding 5° C. and completing the sulfonation at a temperature not exceeding about 25° C.

8. In the process of preparing Stebbins acid by the sulfonation of beta-naphthol with concentrated sulfuric acid, the improvement which comprises rapidly adding the beta-naphthol to the sulfuric acid pre-cooled to a temperature not exceeding about 5° C., completing the sulfonation at a temperature of about 20° to 25° C., and adding the completed sulfonation mixture without delay to ice water.

9. The process of preparing Stebbins acid which comprises adding within a period not exceeding 3 minutes about 100 parts by weight of beta-naphthol to about 200–230 parts by weight of 98 to 100 per cent. sulfuric acid while preventing the temperature from exceeding about 25° C., and causing the Stebbins acid to crystallize from the reaction mixture substantially as soon as the reaction mixture becomes supersaturated therewith.

10. The process of preparing Stebbins acid which comprises adding within a period not exceeding about 5 minutes about 100 parts by weight of beta-naphthol to about 200–230 parts by weight of about 100 per cent, sulfuric acid, while preventing the temperature from exceeding about 25° C., and adding a crystal of Stebbins acid to the reaction mixture as a seed about 8 to 13 minutes after the beta-naphthol has all been added, whereby the Stebbins acid formed is caused to crystallize.

11. The process of preparing Stebbins acid which comprises adding within a period not exceeding about 5 minutes about 100 parts by weight of beta-naphthol to about 200–230 parts by weight of about 100 per cent. sulfuric acid cooled to a temperature of about 5°

C., adding a crystal of Stebbins acid to the reaction mixture as a seed about 8 to 13 minutes after the beta-naphthol has all been added, whereby the Stebbins acid formed is caused to crystallize, and continuing the sulfonation until substantially all of the beta-naphthol has been sulfonated.

12. The process of preparing Stebbins acid which comprises adding within a period not exceeding about 5 minutes about 100 parts by weight of beta-naphthol to about 200–230 parts by weight of 98 to 100 per cent. sulfuric acid while preventing the temperature from exceeding about 25° C. and causing the Stebbins acid to crystallize from the reaction mixture substantially as soon as the reaction mixture becomes supersaturated therewith.

13. The process of preparing Stebbins acid which comprises adding within a period not exceeding about 5 minutes about 100 parts by weight of beta-naphthol to about 200–230 parts by weight of about 100 per cent. sulfuric acid cooled to a temperature of about 5° C., adding a crystal of Stebbins acid to the reaction mixture as a seed about 8 to 13 minutes after the beta-naphthol has all been added, whereby the Stebbins acid formed is caused to crystallize, continuing the sulfonation until substantially all of the beta-naphthol has been sulfonated, while preventing the temperature from exceeding about 30° C., diluting the resulting sulfonation mixture with cold water without delay, and separating the Stebbins acid.

14. The process of preparing Stebbins acid which comprises adding within a period not exceding about 3 minutes about 100 parts by weight of beta-naphthol to about 200–230 parts by weight of about 100 per cent. sulfuric acid cooled to a temperature of about 5° C., adding a crystal of Stebbins acid to the reaction mixture as a seed about 8 to 13 minutes after the beta-naphthol has all been added, whereby the Stebbins acid formed is caused to crystallize, continuing the sulfonation at a temperature not exceeding 30° C. for about 30 minutes after all of the beta-naphthol has been added, and diluting the resulting sulfonation mixture without delay while preventing the temperature from rising above 25° C.

15. The process of preparing Stebbins acid which comprises adding within a period not exceeding about 3 minutes about 100 parts by weight of beta-naphthol to about 200–230 parts by weight of about 100 per cent. sulfuric acid cooled to a temperature of about 5° C., adding a crystal of Stebbins acid to the reaction mixture as a seed about 8 to 13 minutes after the beta-naphthol has all been added, whereby the Stebbins acid formed is caused to crystallize, continuing the sulfonation at a temperature not exceeding 25° C. for about 30 minutes after all of the beta-naphthol has been added, diluting the resulting sulfonation mixture without delay while preventing the temperature from rising above 25° C., and salting out the Stebbins acid.

16. The process of preparing Stebbins acid which comprises adding within a period not exceeding about 3 minutes about 100 parts by weight of beta-naphthol to about 215–220 parts by weight of 100 per cent. sulfuric acid cooled to a temperature of about 5° C., adding a crystal of Stebbins acid to the reaction mixture as a seed about 8 to 13 minutes after the beta-naphthol has all been added, whereby the Stebbins acid formed is caused to crystallize, continuing the sulfonation at a temperature not exceeding 30° C. for about 30 minutes after all of the beta-naphthol has been added, while preventing the temperature from exceeding about 30° C., diluting the resulting sulfonation mixture without delay while preventing the temperature from rising above about 25° C., filtering off insoluble material, salting out the Stebbins acid by means of sodium chloride, and separating the Stebbins acid sodium salt.

17. In the process of preparing Stebbins acid by sulfonating beta-naphthol with concentrated sulfuric acid, the improvement which comprises removing the Stebbins acid formed from the sphere of reaction by causing it to crystallize out of the solution while continuing the sulfonation of the beta-naphthol.

18. In the process of preparing Stebbins acid by sulfonating beta-naphthol with concentrated sulfuric acid, the improvement which comprises adding crystallized Stebbins acid to the reaction mixture substantially as soon as it becomes saturated therewith, whereby the Stebbins acid formed is caused to crystallize, and continuing the sulfonation of the beta-naphthol, the Stebbins acid continuing to crystallize out as formed.

19. The process of preparing Stebbins acid which comprises rapidly adding about 100 parts by weight of beta-naphthol to about 200–230 parts by weight of 98 to 100% sulfuric acid while preventing the temperature from exceeding about 25° C., and causing the Stebbins acid to crystallize from the reaction mixture about 8 to about 13 minutes after the beta-naphthol has all been added.

20. The process of preparing Stebbins acid which comprises adding within a period not exceeding about 3 minutes, about 100 parts by weight of beta-naphthol to about 200–230 parts by weight of 98 to 100% sulfuric acid precooled to a temperature not exceeding about 5° C., and causing the Stebbins acid to crystallize from the reaction mixture about 8 to about 13 minutes after the beta-naphthol has all been added, while maintaining a temperature not exceeding about 30° C.

21. In the process of preparing Stebbins acid by sulfonating beta-naphthol with concentrated sulfuric acid, the improvement which comprises removing the Stebbins acid formed from the sphere of the action by causing it to crystallize out of solution substantially as soon as the reaction mixture becomes supersaturated therewith, and continuing the sulfonation of the beta-naphthol at a temperature not exceeding about 30° C., the Stebbins acid continuing to crystallize out as formed.

22. In the process of preparing Stebbins acid by sulfonating beta-naphthol with concentrated sulfuric acid, the improvement which comprises rapidly adding the beta-naphthol to 93 to 100% sulfuric acid pre-cooled to a temperature not exceeding about 15° C., causing the Stebbins acid to crystallize from the reaction mixture about 8 to about 13 minutes after the beta-naphthol has all been added, and continuing the sulfonation of the beta-naphthol, the Stebbins acid continuing to crystallize out as formed.

23. In the process of preparing Stebbins acid by sulfonating beta-naphthol with concentrated sulfuric acid, the improvement which comprises rapidly adding the beta-naphthol to 98 to 100% sulfuric acid pre-cooled to a temperature not exceeding about 5° C., causing the Stebbins acid to crystallize from the reaction mixture about 8 to about 13 minutes after the beta-naphthol has all been added, and continuing the sulfonation of the beta-naphthol at a temperature not exceeding about 30° C., the Stebbins acid continuing to crystallize out as formed.

In witness whereof, I have hereunto set my hand.

WILLIAM J. COTTON.